US010215992B2

(12) United States Patent
Jolic (10) Patent No.: US 10,215,992 B2
(45) Date of Patent: Feb. 26, 2019

(54) MULTICHANNEL OPTICALLY VARIABLE DEVICE

(75) Inventor: Karlo Ivan Jolic, West Footscray (AU)

(73) Assignee: CCL Secure Pty Ltd, Craigieburn, Victoria (AU)

( * ) Notice: Subject to any disclaimer, the term of this patent is extended or adjusted under 35 U.S.C. 154(b) by 209 days.

(21) Appl. No.: 13/818,111

(22) PCT Filed: Aug. 19, 2011

(86) PCT No.: PCT/AU2011/001063
§ 371 (c)(1),
(2), (4) Date: Feb. 21, 2013

(87) PCT Pub. No.: WO2012/024718
PCT Pub. Date: Mar. 1, 2012

(65) Prior Publication Data
US 2013/0155519 A1    Jun. 20, 2013

(30) Foreign Application Priority Data

Aug. 23, 2010 (AU) ................. 2010903754

(51) Int. Cl.
*G02B 27/10* (2006.01)
*B44F 1/10* (2006.01)
(Continued)

(52) U.S. Cl.
CPC ............. *G02B 27/10* (2013.01); *B42D 25/29* (2014.10); *B42D 25/328* (2014.10);
(Continued)

(58) Field of Classification Search
CPC ............ B42D 2033/24; B42D 2035/16; B42D 2035/26; B42D 2035/50; B42D 25/29;
(Continued)

(56) References Cited

U.S. PATENT DOCUMENTS 6,256,149 B1    7/2001  Rolfe
7,333,268 B2    2/2008  Steenblik et al.
(Continued)

FOREIGN PATENT DOCUMENTS

WO    2010099571 A1    9/2010

OTHER PUBLICATIONS

Preliminary Report on Patentability for International Patent Application No. PCT/AU2011/001063; Oct. 30, 2012.
(Continued)

*Primary Examiner* — Joseph P Martinez
*Assistant Examiner* — Vipin Patel
(74) *Attorney, Agent, or Firm* — Christopher M. Scherer; DeWitt Ross & Stevens S.C.

(57) ABSTRACT

A security element, a security device including a security element and a method of manufacturing a security device. The element having focusing elements and image elements, the image elements are located in an object plane such that each image element is associated with one of the focusing elements, wherein the object plane includes at least first and second distinct subregions, and an image element within the first subregion is phase-displaced by a phase-displacement distance with respect to an image element within the second subregion, and wherein the first and second subregions produce first and second optically variable images or part-images.

20 Claims, 9 Drawing Sheets

(51) Int. Cl.
*G02B 3/00* (2006.01)
*B42D 25/425* (2014.01)
*B42D 25/29* (2014.01)
*B42D 25/328* (2014.01)
*B42D 25/324* (2014.01)

(52) U.S. Cl.
CPC .............. *B42D 25/425* (2014.10); *B44F 1/10* (2013.01); *G02B 3/0037* (2013.01); *B42D 25/324* (2014.10); *B42D 2033/24* (2013.01); *B42D 2035/16* (2013.01); *B42D 2035/26* (2013.01); *B42D 2035/50* (2013.01)

(58) Field of Classification Search
CPC .. B42D 25/324; B42D 25/328; B42D 25/425; B44F 1/10; G02B 27/10; G02B 3/0037
USPC .......................................... 359/619–620, 626
See application file for complete search history.

(56) References Cited

U.S. PATENT DOCUMENTS

| | | | |
|---|---|---|---|
| 2007/0058260 A1* | 3/2007 | Steenblik et al. | 359/626 |
| 2009/0102605 A1* | 4/2009 | Kaule | 340/5.86 |
| 2009/0322071 A1 | 12/2009 | Dichtl | |
| 2010/0194094 A1* | 8/2010 | Kiuchi | B42D 25/333 283/113 |

OTHER PUBLICATIONS

International Search Report for International Patent Application No. PCT/AU2011/001063; dated Oct. 12, 2011.

\* cited by examiner

MULTICHANNEL OPTICALLY VARIABLE DEVICE

PRIORITY CLAIM

This patent application is a U.S. National Phase of International Patent Application No. PCT/AU2011/001063, filed 19 Aug. 2011, which claims priority to Australian Patent Application No. 2010903754, filed 23 Aug. 2010, the disclosures of which are incorporated herein by reference in their entirety.

FIELD

The disclosed embodiments relate to optically variable devices for security and decorative purposes, and methods of their manufacture.

BACKGROUND

It is known to provide optically variable devices in which arrays of lenticular (part-cylindrical lenses) focus on an object plane containing multiple sets of interleaved image elements. Each set of image elements (strips) belongs to a distinct image, so that as the person viewing the device changes the angle of view, a different image becomes visible. Devices including non-cylindrical lenses, for example those including two-dimensional arrays of spherical microlenses, are also known.

In security applications, and in particular when dealing with flexible security documents such as banknotes, it is desirable to minimise the thickness of a lens array applied to the security document. Known lenticular devices as described above, being relatively thick (hundreds of microns), are unsuitable for application to flexible security documents.

To avoid adding significantly to the thickness of a banknote, microlenses which have a relatively small focal length, and which must therefore be of relatively small transverse dimension (perhaps of the order of 50-65 microns or less) are desirable. Lenses of this size place significant constraints on the processes which can be used to apply the image elements to the object plane. For example, gravure printing (sometimes known as rotogravure printing) can presently only consistently produce printed line widths of 35 microns or more. With this line width, lenses of transverse dimension 65 microns are only sufficiently wide to enable implementation of very simple optically variable effects such as monochromatic flipping images, in which the contrast of the image switches from positive to negative as the viewing angle changes. More complex multi-frame effects are not possible via gravure printing due to the limitation on minimum gravure-printed feature size.

It has been found that simple effects such as the flipping images described above can easily be counterfeited solely using printing techniques. Such effects therefore have limited security value. Their security value could potentially be increased by printing lines that are significantly smaller than 35-45 microns. However, the difficulty has been that it is not possible to reliably print lines significantly smaller than 35-45 microns using traditional gravure printing.

In view of the difficulties described above, it is desirable to provide a security device which is more resistant to counterfeiting, yet which can be produced by a wider variety of security printing techniques, including gravure printing.

Definitions

Focal Point Size H

As used herein, the term focal point size refers to the dimensions, usually an effective diameter or width, of the geometrical distribution of points at which rays refracted through a lens intersect with an object plane at a particular viewing angle. The focal point size may be inferred from theoretical calculations, ray tracing simulations, or from actual measurements.

Focal Length f

In the present specification, focal length, when used in reference to a microlens in a lens array, means the distance from the vertex of the microlens to the position of the focus given by locating the maximum of the power density distribution when collimated radiation is incident from the lens side of the array (see T. Miyashita, "Standardization for microlenses and microlens arrays" (2007) *Japanese Journal of Applied Physics* 46, p 5391).

Gauge Thickness t

The gauge thickness is the distance from the apex of a lenslet on one side of the transparent or translucent material to the surface on the opposite side of the translucent material on which the image elements are provided which substantially coincides with the object plane.

Lens Frequency and Pitch

The lens frequency of a lens array is the number of lenslets in a given distance across the surface of the lens array. The pitch is the distance from the apex of one lenslet to the apex of the adjacent lenslet. In a uniform lens array, the pitch has an inverse relationship to the lens frequency.

Lens Width W

The width of a lenslet in a microlens array is the distance from one edge of the lenslet to the opposite edge of the lenslet. In a lens array with hemispherical or semi-cylindrical lenslets, the width will be equal to the diameter of the lenslets.

Radius of Curvature R

The radius of curvature of a lenslet is the distance from a point on the surface of the lens to a point at which the normal to the lens surface intersects a line extending perpendicularly through the apex of the lenslet (the lens axis).

Sag Height s

The sag height or surface sag s of a lenslet is the distance from the apex to a point on the axis intersected by the shortest line from the edge of a lenslet extending perpendicularly through the axis.

Refractive Index n

The refractive index of a medium n is the ratio of the speed of light in vacuo to the speed of light in the medium. The refractive index n of a lens determines the amount by which light rays reaching the lens surface will be refracted, according to Snell's law:

$$n_i * \mathrm{Sin}(\alpha) = n * \mathrm{Sin}(\theta),$$

where $\alpha$ is the angle between an incident ray and the normal at the point of incidence at the lens surface, $\theta$ is the angle between the refracted ray and the normal at the point of incidence, and $n_1$ is the refractive index of air (as an approximation $n_1$ may be taken to be 1).

Conic Constant P

The conic constant P is a quantity describing conic sections, and is used in geometric optics to specify spherical (P=1), elliptical (0<P<1, or P>1), parabolic (P=0), and hyperbolic (P<0) lens. Some references use the letter K to represent the conic constant. K is related to P via K=P−1.

Lobe Angle

The lobe angle of a lens is the entire viewing angle formed by the lens.

Abbe Number

The Abbe number of a transparent or translucent material is a measure of the dispersion (variation of refractive index with wavelength) of the material. An appropriate choice of Abbe number for a lens can help to minimize chromatic aberration.

Security Document

As used herein, the term security document includes all types of documents and tokens of value and identification documents including, but not limited to the following: items of currency such as banknotes and coins, credit cards, cheques, passports, identity cards, securities and share certificates, driver's licences, deeds of title, travel documents such as airline and train tickets, entrance cards and tickets, birth, death and marriage certificates, and academic transcripts.

Transparent Windows and Half Windows

As used herein the term window refers to a transparent or translucent area in the security document compared to the substantially opaque region to which printing is applied. The window may be fully transparent so that it allows the transmission of light substantially unaffected, or it may be partly transparent or translucent partially allowing the transmission of light but without allowing objects to be seen clearly through the window area.

A window area may be formed in a polymeric security document which has at least one layer of transparent polymeric material and one or more opacifying layers applied to at least one side of a transparent polymeric substrate, by omitting least one opacifying layer in the region forming the window area. If opacifying layers are applied to both sides of a transparent substrate a fully transparent window may be formed by omitting the opacifying layers on both sides of the transparent substrate in the window area.

A partly transparent or translucent area, hereinafter referred to as a "half-window", may be formed in a polymeric security document which has opacifying layers on both sides by omitting the opacifying layers on one side only of the security document in the window area so that the "half-window" is not fully transparent, but allows some light to pass through without allowing objects to be viewed clearly through the half-window.

Alternatively, it is possible for the substrates to be formed from an substantially opaque material, such as paper or fibrous material, with an insert of transparent plastics material inserted into a cut-out, or recess in the paper or fibrous substrate to form a transparent window or a translucent half-window area.

Opacifying Layers

One or more opacifying layers may be applied to a transparent substrate to increase the opacity of the security document. An opacifying layer is such that $L_T < L_0$, where $L_0$ is the amount of light incident on the document, and $L_T$ is the amount of light transmitted through the document. An opacifying layer may comprise any one or more of a variety of opacifying coatings. For example, the opacifying coatings may comprise a pigment, such as titanium dioxide, dispersed within a binder or carrier of heat-activated cross-linkable polymeric material. Alternatively, a substrate of transparent plastic material could be sandwiched between opacifying layers of paper or other partially or substantially opaque material to which indicia may be subsequently printed or otherwise applied.

SUMMARY

At least one disclosed embodiment provides a security element, including a plurality of focusing elements and a plurality of image elements, the image elements being located in an object plane such that each image element is associated with one of the focusing elements, wherein the object plane includes at least first and second distinct subregions, and an image element within the first subregion is phase-displaced by a phase-dispacement distance with respect to an image element within the second subregion, and wherein the first and second subregions produce first and second optically variable images or part-images.

Introducing a phase displacement between the subregions provides for an increased number of animation frames compared to standard lenticular devices using the same image element size underneath the lens. In principle, there is no limit to the number of animation frames which may be produced using devices according to the disclosed embodiments.

BRIEF DESCRIPTION OF THE DRAWINGS

Disclosed embodiments will now be described, by way of non-limiting example only, by reference to the accompanying drawings, in which.

DETAILED DESCRIPTION OF THE DISCLOSED EMBODIMENTS

In at least one disclosed embodiment, the image elements of the first and/or second subregions are paired with complementary image elements, such that the first and/or second optically variable images are flipping images.

A flipping image is an image that changes between different states, for example between a positive state and a negative state, at different viewing angles.

Optionally, the focusing elements are located a distance from the object plane which is less than the focal length of the focusing elements. The distance may be such that the focal point width of the focusing elements in the object plane is substantially equal to the size of the image elements, or differs from the size of the image elements by a predetermined amount whilst still producing the first and second images.

Shifting the focusing elements to a slightly off-focus position, but which still allows the security element to form a recognizable image, can provide the ability for each focusing element to project a particular intensity, due to the extent of the focal spot of the focusing element in the object plane.

The security element may further include additional subregions, wherein an image element within each additional subregion is phase-displaced with respect to the image elements of the first and second subregions, and each additional subregion produces a further image or part-image which changes brightness as the viewing angle is changed. Any number of subregions may in principle be chosen, although the maximum number of subregions will, in general, depend on the maximum number of distinct phase displacements which can be chosen in order to produce distinguishable images or part-images at different viewing angles.

The subregions may take any desired shape or size. In one disclosed embodiment the subregions are of different shapes and sizes. In another disclosed embodiment, an array of subregions of substantially the same shape and/or size may be provided. In the latter case, each subregion may produce a part-image, with all of the subregions together producing a composite image, for example a portrait.

The subregions may collectively produce a greyscale image having at least three grey levels. The grey levels may be determined by the phase displacements between the image elements in the subregions.

In at least one disclosed embodiment, the subregions collectively produce a greyscale image which appears to change contrast substantially continuously as the viewing angle changes. The projected image at each viewing angle is unique and results in a highly dynamic, characteristic and overt effect that is easily recognizable and more difficult to copy using printing methods alone.

Optionally, the image elements are gravure-printed elements. Alternatively, they may be embossed, offset-printed, screen printed or flexographically printed elements. The image elements may be line elements, but can also be other shapes, such as dots, other geometrical shapes, alphanumeric characters and so on, depending on the method used to apply the image elements.

If the image elements are line elements, they may have a width which is substantially equal to half the width of the focussing elements.

The focusing elements may be refractive or diffractive cylindrical lenses, or zone plates. They may also be refractive or diffractive part-spherical or polygonal-base microlenses. In another disclosed embodiment, the focusing elements are cylindrical lenses having a part-elliptical profile in a plane perpendicular to the lens axis.

Another disclosed embodiment provides a security device including a security element according to any one of the above disclosed embodiments.

Another disclosed embodiment provides a security document including a security device.

Yet another disclosed embodiment provides a banknote substrate, including a security element according to any one of the above disclosed embodiments.

A further disclosed embodiment provides a method of forming a security device, including the steps of providing a transparent or translucent substrate, applying a plurality of focusing elements to a first surface of the substrate, and applying a plurality of image elements to an image surface of the substrate, each image element being associated with one of the focusing elements, wherein the image surface includes at least first and second distinct subregions, and an image element within the first subregion is phase-displaced with respect to an image element within the second subregion, and wherein the first and second subregions produce first and second images or part-images.

The focusing elements may be applied by embossing, for example by being embossed in a layer of radiation-curable ink applied to the first surface of the substrate.

The image elements may be applied by gravure printing. They may also be applied by embossing, offset printing, screen-printing or flexographic printing.

Referring initially to FIGS. 1A, 1B, 1C, 1D, 1E, 1F, 1G, 1H and 1J, there is shown a plan view of a security element 10, having subregions 10A, 10B, 10C and 10D. Subregion 10A produces an image 20A at a first viewing angle. At a second viewing angle, subregion 10A undergoes a change in appearance, switching contrast to show a negative image 20A'. In image 20A', light areas become dark, and dark areas (the letters 'A' and 'U') become light.

Likewise, subregion 10B produces an image 20B at a first viewing angle, and a negative image 20B' at a second viewing angle, subregion 10C produces positive and negative images 20C, 20C', and subregion 10D produces positive and negative images 20D, 20D'.

In conventional lenticular imagery, the contrast switch from positive to negative would occur at the same angle for each of the subregions 10A-10D. The embodiment shown in FIGS. 1A, 1B, 1C, 1D, 1E, 1F, 1G, 1H and 1J produces a more complex, multichannel "flipping image" effect, by arranging the different subregions 10A-10D of the lenticular image to project their positive states to the viewer at different viewing angles. The result is a more complex positive/negative contrast switch effect that is much more difficult to counterfeit solely using printing. The present inventors have found from experiment that it is not possible to simulate projection of the positive state of different image subregions at different viewing angles, solely using printing methods.

Figure 2:
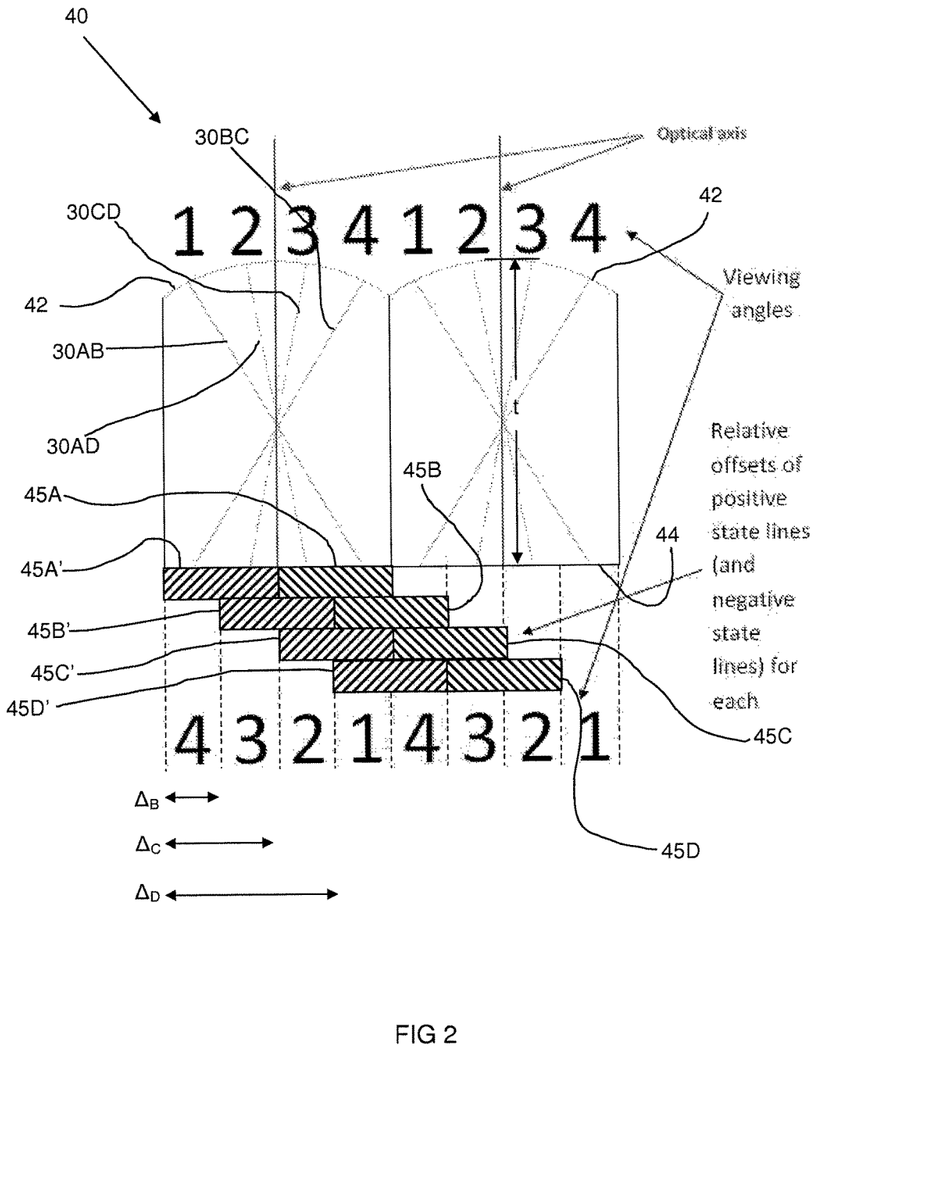
FIG. 2 is a sectional view of one disclosed embodiment of a security element.

Referring now to FIG. 2, the relative position of gravure-printed lines for image elements in the different subregions 10A-10D is shown. FIG. 2 shows a security element 40 having a plurality of focusing elements in the form of lenticular (cylindrical) lenslets 42. The lenslets 42 are located a distance t from an object plane 44 in which a plurality of image elements 45A, 45B, 45C, 45D are located. Image elements 45A are paired with complementary image elements 45A', image elements 45B with complementary image elements 45B', and so on. The distance t is substantially equal to the focal length of lenslets 42.

Image elements 45A and complementary image elements 45A' will generally be of the same color to produce a flipping image. Image elements 45B, etc may be the same color as 45A, or may be a different color if desired.

The lenslets of FIG. 2 have a width of 63.5 microns, and the image elements 45A, etc. a width of 35 microns, i.e. approximately equal to half the lenslet width. The image element width may be increased beyond 35 microns, for example to 45 microns.

Figure 1A:
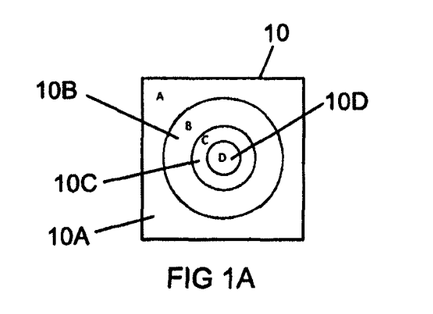
FIGS. 1A, 1B, 1C, 1D, 1E, 1F, 1G, 1H and 1J shows a plan view of a multiplicity of optically variable image regions to be applied to a security element.
Figure 1B:
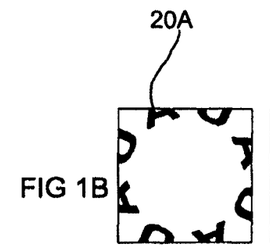
Figure 1C:
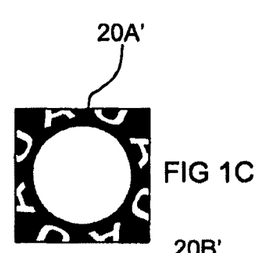
Figure 1D:
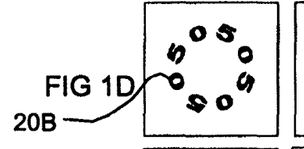
Figure 1E:
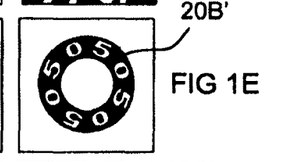
Figures 1F, 1H:
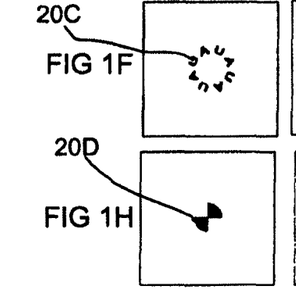
Figures 1G, 1J:
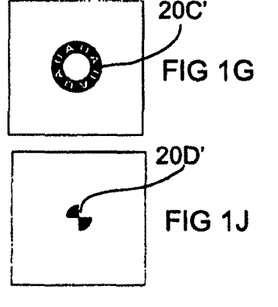

The image elements 45A and complementary image elements 45A' are located within subregion 10A of the security element. When the security element is viewed at a first angle $\theta_A$, only "negative" complementary image elements 45A' of subregion 10A are in the field of view of the lenslets 42, and so the negative image 20A' of FIG. 1C is apparent to the viewer. On the other hand, when viewed at a second angle $\Phi_A$, only "positive" image elements 45A are visible, thus producing positive image 20A to the viewer.

Similarly, when the security element is viewed at angle $\theta_B$, the negative complementary image elements 45B' of subregion 10B are visible and produce negative image 20B', while at a second angle $\Phi_B$, the positive image elements 45B become visible to display positive image 20B. The skilled person will understand that labels 'A' and 'B' may be replaced by 'C' and 'D' in the foregoing.

Each of the pairs of image elements and complementary image elements, e.g. (45A, 45A') and (45B, 45B') are essentially identical in their physical characteristics, and within a particular subregion 10A or 10B, the location of the image elements or complementary image elements relative to associated lenslets 42 does not vary. However, a phase displacement has been introduced between image elements in different subregions, in order to allow different subregions to display a contrast switch at different angles, independently of the other subregions.

In the example of FIG. 2, there is a phase displacement of ΔB for image elements 45B relative to image elements 45A, a phase displacement of ΔC for image elements 45C relative to image elements 45A, and a phase displacement of ΔD for image elements 45D relative to image elements 45A. The phase displacements in this case are one-quarter, one-half and three-quarters of the width of lenslets 42, though it will be understood that a variety of phase displacements, not necessarily being integer multiples of the smallest phase displacement (which in this case is one quarter the lenslet width), could be used.

Figure 3:
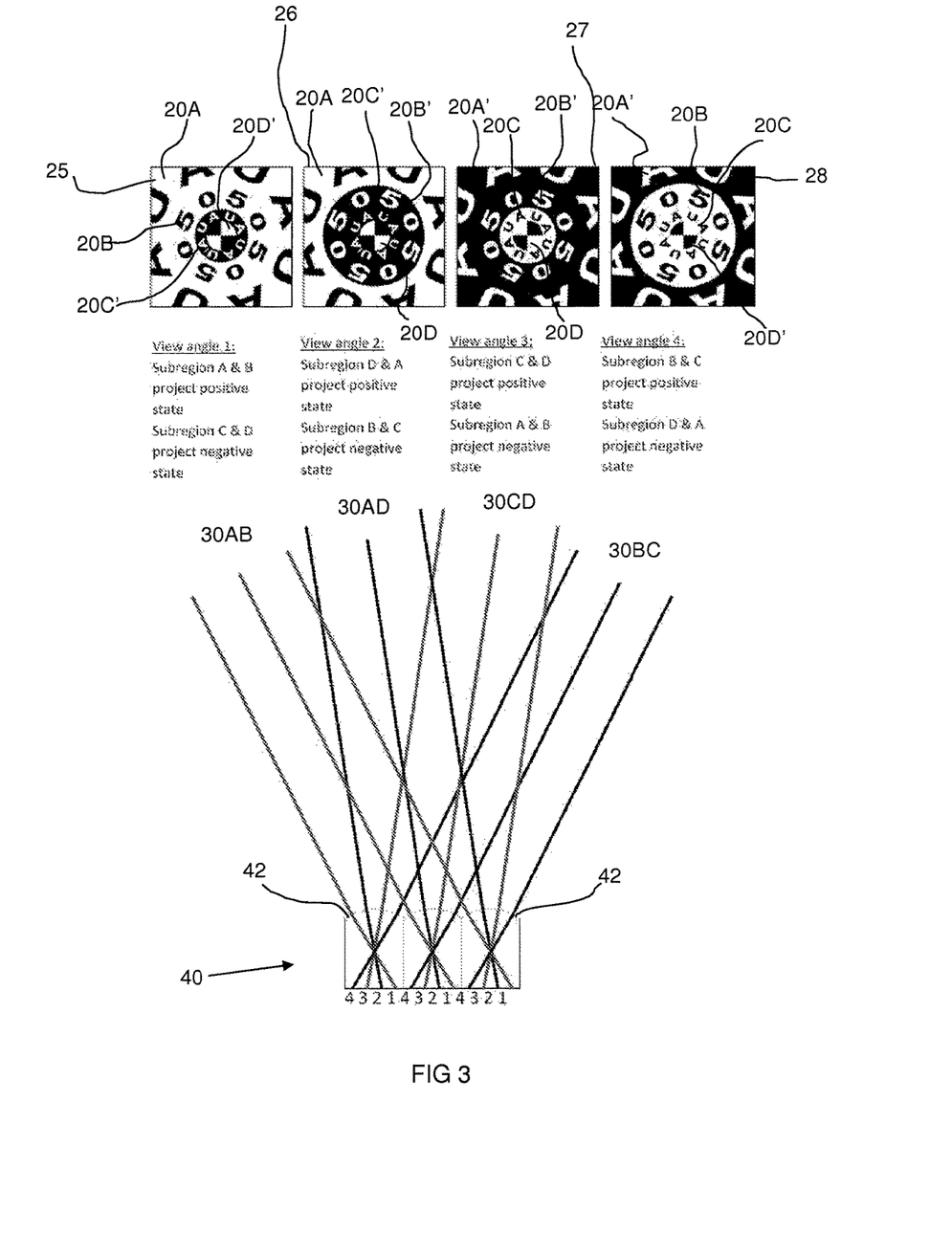
FIG. 3 illustrates a monochromatic (binary) optically variable contrast switch effect produced by the security element of FIG. 2.

FIG. 3 shows the image sequence seen by an observer as their viewing angle relative to the security element is changed. At a first viewing angle 30AB, subregions 10A and 10B project their positive state, i.e. positive images 20A and 20B, while subregions 10C and 10D project their negative state, i.e. negative images 20C' and 20D'. The net impression conveyed to the viewer is an image 25 composed of sub-images 20A, 20B, 20C' and 20D'.

As the viewing angle is changed to 30AD, subregion 10B switches to its negative state 20B' while subregion 10D changes to its positive state 20D. At viewing angle 30CD, subregion 10A switches to its negative state 20A' and subregion 10C switches to its positive state 20C so that image 27 is produced. Finally, at angle 30BC, subregion 10B switches back to its positive state 20B, while subregion 10D switches back to its negative state 20D', producing the impression of image 28 to the viewer.

The introduction of the three different phase displacements between the different subregions allows for 4 distinct frames of lenticular animation with a single color and shape of image element, as opposed to prior art devices in which only 2 frames of animation would be possible: frame 1 would be the positive state of the entire image and frame 2 would be the negative state of the entire image.

Figure 4A:
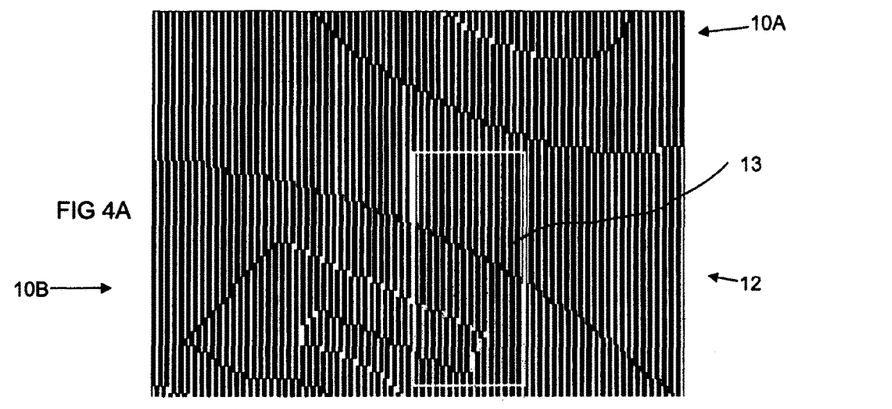
FIGS. 4A and 4B shows a magnified plan view of part of the security element of FIG. 2.
Figure 4B:
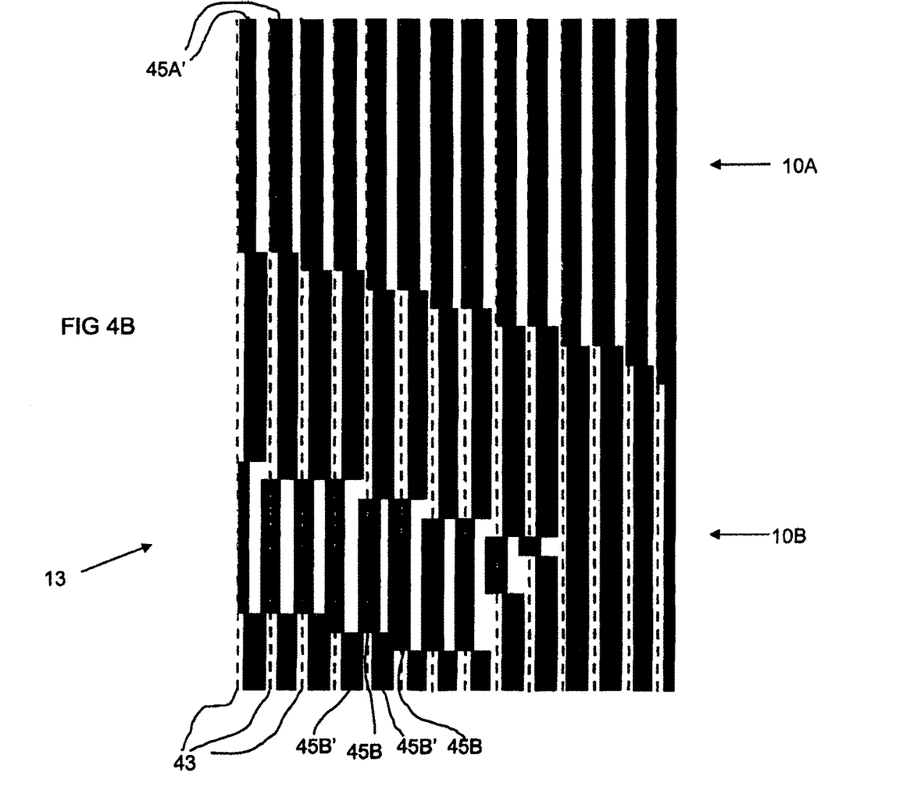

Referring now to FIGS. 4A and 4B, there is shown a part 12 of the object plane 44 of security element 40. Part 12 spans subregions 10A and 10B of the device. Shown in greatly magnified view, FIG. 4B is a region 13 of the part 12. Region 13 includes image elements 45B and complementary image elements 45A' and 45B'. Dashed lined 43 depict the boundaries of associated lenses 42. The left edges of complementary image elements 45A' are reliant with the left edges of the associated lenses. On the other hand, the left edges of complementary image elements 45B' of subregion 10B are phase-displaced by a distance D from the left hand edge of the associated lenses and also of complementary image elements 45A'. In the example shown, the phase displacement D is approximately one quarter the width of the lenses 42.

In yet another disclosed embodiment, the distance t between the lenslets 42 and the object plane 44 is made less than the focal length of the lenslets. It may be that the distance t is such that the focal point width of the lenslets in the object plane 44 is dependent on the size of the image elements 45A and complementary image elements 45A' etc. The lenslet parameters can be chosen such that the on-axis focal point width is substantially equal to the width of an image element 45A, or is within 20% of the width of image elements 45A, for example by using methods as described in our co-pending PCT application PCT/AU2010/000243, the entirety of which is incorporated herein by reference.

Increasing the focal point width allows for variability in the brightness of a particular image element 45A or complementary image element 45A' etc. when viewed through lenslets 42, because at some viewing angles, not all of the focal spot will overlap with the image element 45A or complementary image element 45A' due to the finite extent of the spot. The greater the increase in focal point width, the greater the range of angles over which the image element brightness can be varied.

Figure 5:
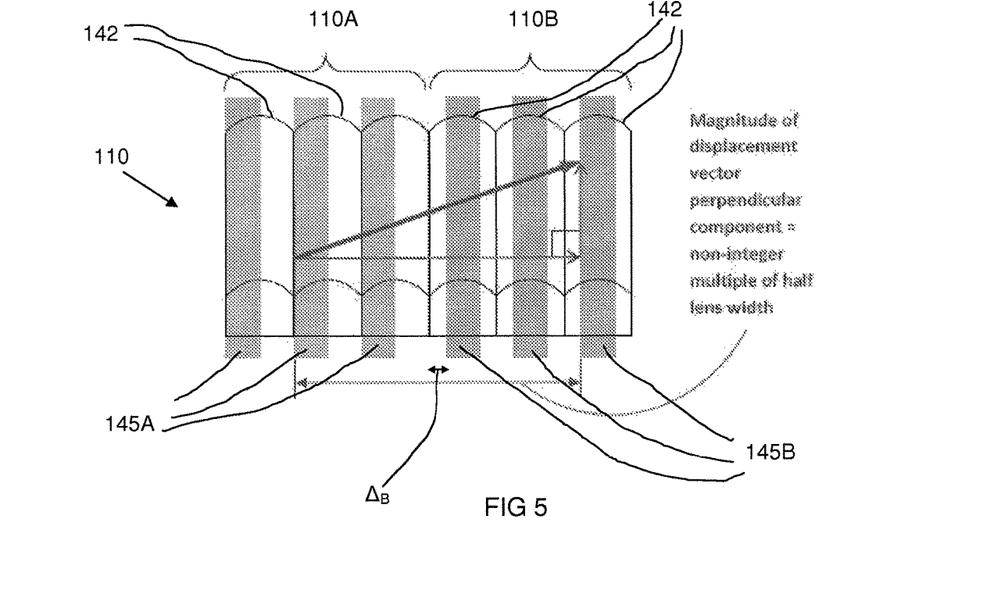
FIG. 5 shows a method of introducing multiple grey levels into a security element.

The principle can be illustrated by reference to FIGS. 5 and 6, in which identical lenslets 142 having optical axis 140 view three different image elements 145A, 145B, 145C at an off-axis angle 130. The image elements each have a width w, which is approximately equal to the focal point width. It will of course be appreciated that the focal point width may be different on-axis and off-axis, but it is assumed to be constant for the purposes of illustration. We have found for the 63.5 micron width lenses used to construct prototype devices that the focal point width is approximately 30 microns on-axis, and approximately 23 microns at points which are far off-axis (near the edges of the lobe angle of the lenslets).

Figure 6:
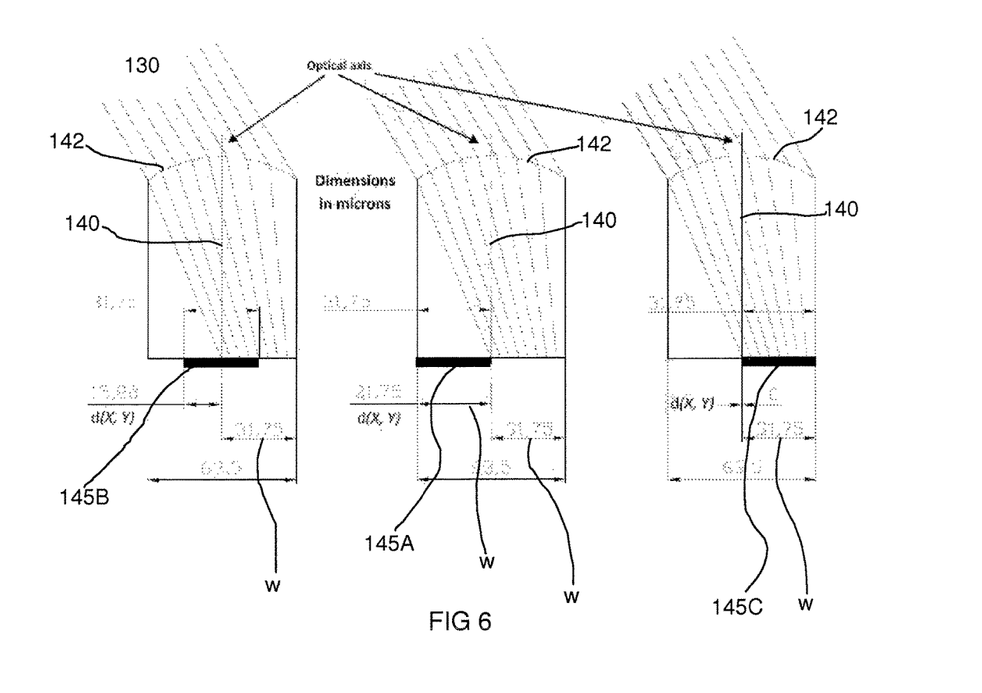
FIG. 6 illustrates schematically how the display of images or part-images at different viewing angles can be controlled.
Figure 7A:
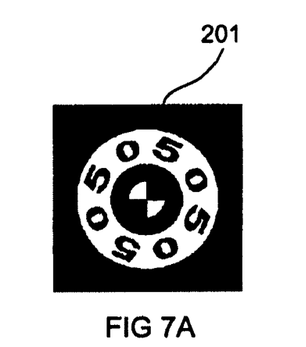
FIGS. 7A, 7B, 7C, 7D and 7E shows another disclosed embodiment of a security element which produces a continuous tone optically variable image having a gradual change in contrast with viewing angle.
Figure 7B:
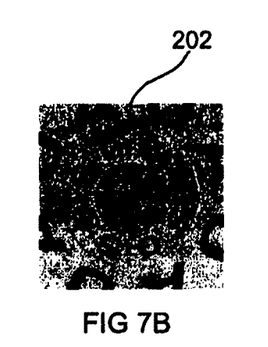
Figure 7C:
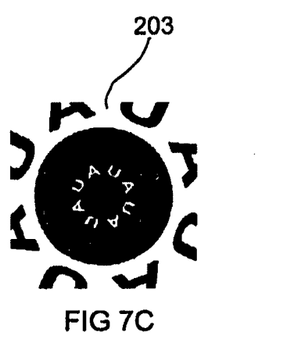
Figure 7D:
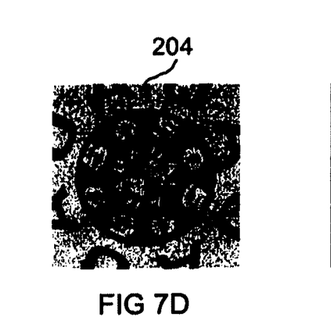
Figure 7E:
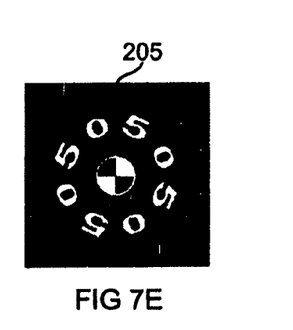

For image element 145C of FIG. 6, the focal spot of cylindrical lenslet 142 completely overlaps the image element 145C and so the maximum brightness for image element 145C is observed by the viewer. If the image element is shifted, so that it lies at position 145A, substantially no light reaches the image element 145A because no part of the spot overlaps with the image element. On the other hand, in an intermediate position 145B where the image element lies on the optical axis 130, approximately half of the spot area falls on image element 145B. The viewer will thus see a brightness which is approximately 50% of the brightness of image element 145A (assuming a spot of constant intensity) when viewed at the same angle. In the case shown, with three different placements of image element, there are thus three unique grey levels visible at a particular viewing angle. As the viewing angle changes, the amount of overlap between the focal spot and the image elements will change. The viewer will thus see a different set of unique grey levels at each viewing angle, up to a maximum of 3 grey levels.

It will be appreciated that a substantially continuous range of image element positions is possible, being limited only by the resolution of the process used to apply the image elements to the object plane 44. For example, in the case of features printed via gravure, the number of unique grey-levels projected to the observer at one viewing angle is dependent on the engraving resolution used to make the gravure printing cylinder. If the lenslets are 63.5 microns wide and the engraving resolution for the gravure process is 6400 dots per inch, this corresponds to 16 different addressable positions underneath each lens (16=63.5/[25400/6400]), and thus a maximum of 16 unique grey levels projected to the observer at any given viewing angle. In this example, it is assumed that:

(i) the focal point width is substantially constant, and approximately equal to half the width of lenslets 142;

(ii) the image elements 145A, 145B, 145C are approximately the same width as the focal point width;

(iii) the focal point width is (approximately) an integer multiple of the smallest possible change in image element position, in this case the engraving resolution for the gravure process.

In the embodiment of FIGS. 1 to 3, the four different image element positions correspond to image elements 45A and complementary image elements 45A', and their phase-displaced counterparts 45B/45B', 45C/45C' and 45D/45D'. When the distance t between lenslets 42 and object plane 44 is less than the focal length of the lenslets, a maximum of four different grey levels are possible at any given viewing angle (again assuming (i)-(iii)), resulting in a multichannel optically variable image exhibiting a greyscale contrast change (as opposed to the binary contrast switch of FIGS. 1 to 4).

A plan view of such a greyscale multichannel security element, with a maximum of four different grey levels at any given viewing angle, is shown in FIGS. 7A, 7B, 7C, 7D and 7E, in which the representations 201 to 205 show the security element as seen from 5 different viewing angles. For example, view 201 has 3 different grey levels, and view 202 only 2 grey levels. Because of the finite extent of the spot in the object plane of the security element, there will also be views intermediate these representations having up to 4 grey levels, and the viewer will see a substantially continuous change in contrast as the viewing angle changes. In principle the total number of grey-levels projected as the viewing angle is continuously changed is infinite. Accordingly the grey-level positive/negative contrast switch effect can be described as projecting a continuum of frames and a continuum of grey-levels as the viewing angle is changed.

Figure 8:
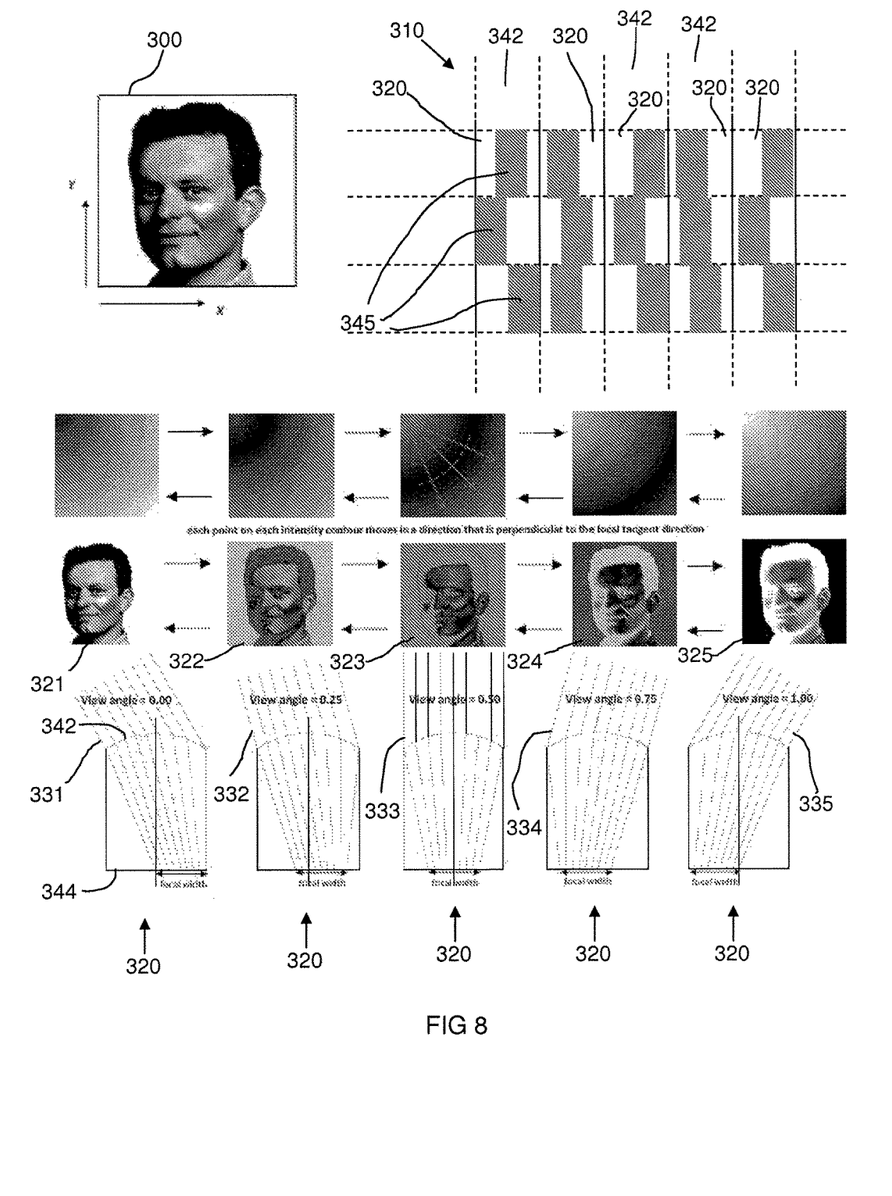
FIG. 8 shows a greyscale optically variable device generated by a bitmap.
Figures 9A, 9B:
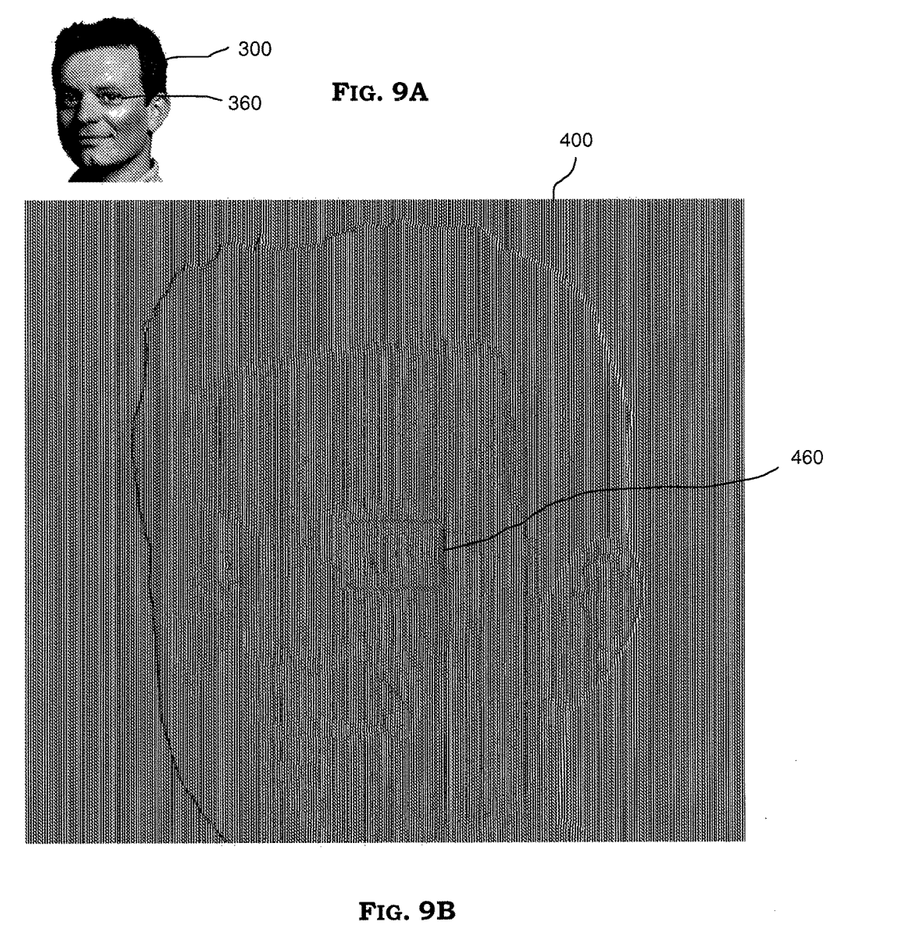
FIGS. 9A and 9B shows the correspondence between pixels of the bitmap of FIG. 8 and the image elements of the device.
Figure 10A:
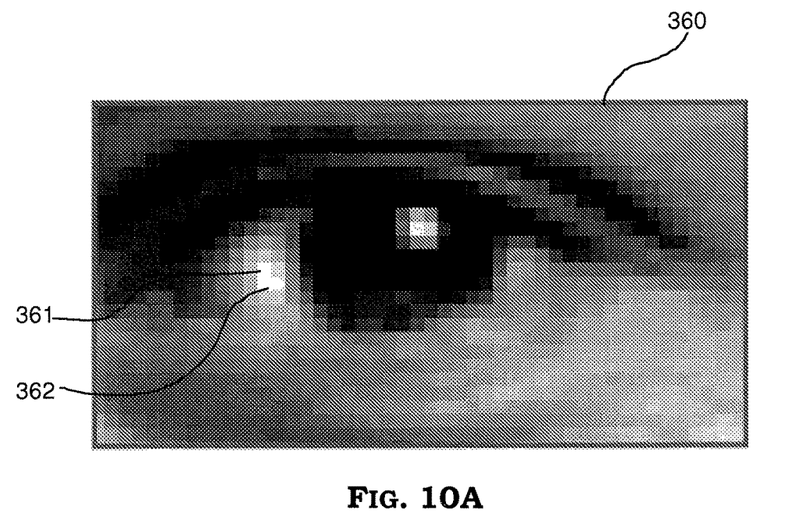
FIGS. 10A and 10B is a close-up of part of the artwork of FIG. 9.
Figure 10B:
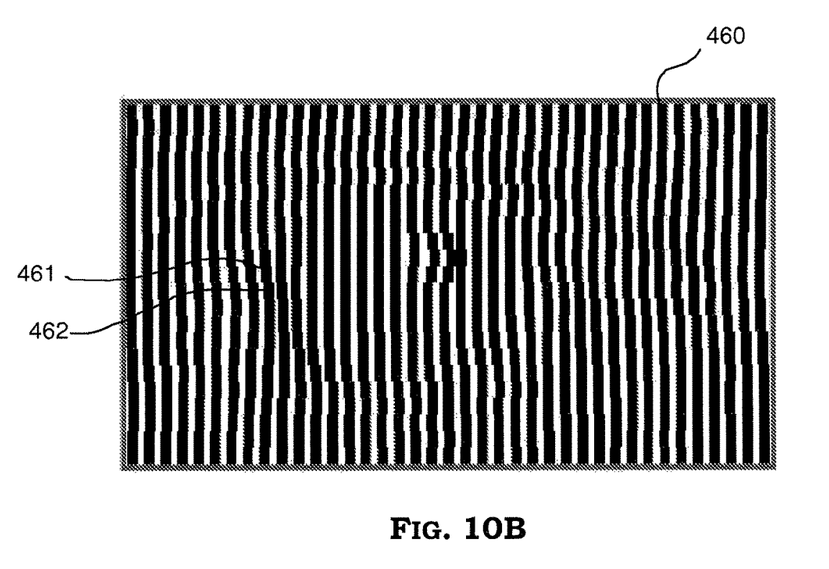

Referring now to FIG. 8, there is shown part of an alternative security element 310 having a plurality of part-cylindrical lenslets 342 and an array of subregions 320 in the object plane 344 of the lenslets 342. The grey levels of the subregions are based on the grey levels of an input image (bitmap) 300. The input bitmap in this case has grey levels from 0 to 255. Each pixel of the bitmap 300 is mapped to a respective subregion 320 comprising a 63.5 micron×63.5 micron square area in the object plane 344 of the security element 310. Each subregion contains a gravure-printed image element 345 of width 35 microns, and the left-hand edges of image elements 345 are offset from the optical axis by a distance which depends on the grey level of the corresponding pixel in the bitmap 300. For example, for a bitmap grey level of 255, the left-hand edge of an image element would lie on the optical axis, so that for viewing angle 331 in FIG. 8, maximum brightness would result.

The phase-displacements, and hence the grey levels seen at a particular viewing angle, may be fixed by any number of methods. The simplest relationship between the phase-displacements and grey levels is to assume a linear relationship between the two, so that for viewing angle 331 in FIG. 8, a phase displacement of one half the focal point width results in a 50% decrease in brightness (i.e., grey level of 127), a phase displacement of one quarter results in a 25% decrease (i.e., grey level of 191), and so on. More sophisticated modelling of the relationship can be done by taking into account the following:

decreasing width of the focal spot as it moves off-axis;
non-linear change in location of the focal spot as a function of viewing angle;
non-constant spot intensity;
the distance from the viewer to the security element.

For example, assuming a Gaussian spot having parameters ($\bar{x}(\theta)$, $\sigma$), and that the centre of the focal spot has a viewing-angle dependent position $\bar{x}(\theta)$ determined by Snell's law, one can derive the following relationship between the brightness of an image element of width w and phase-displacement d observed at angle θ, based on geometrical considerations:

$$I(d, \theta) \propto \sqrt{\frac{\pi}{2}} \sigma \left[ \mathrm{erf}\left(\frac{d + w/2 - \bar{x}(\theta)}{\sqrt{2}\sigma}\right) - \mathrm{erf}\left(\frac{d - w/2 \cdot \bar{x}(\theta)}{\sqrt{2}\sigma}\right) \right]$$

where erf is the error function, and the focal spot position in the object plane is given by:

$$\bar{x}(\theta) = \frac{t \sin\theta}{\sqrt{1 - \frac{1}{n^2}\sin\theta}}.$$

Here t is the distance from the apex of the lenslet to the object plane, and n is the refractive index of the lenslet material.

In practice, we have found that assuming a simple linear relationship between grey level and phase-displacement is sufficient to reproduce the grey levels of an input bitmap image in the optically variable image projected to the viewer from the device 310.

Each image element 345 within a "pixel" 320 of the security element 310 has a particular phase-displacement relative to the optical axis of the lenslets 342. Each group of pixels 345 having the same phase displacement will correspond to a particular grey level in the input bitmap 300. For an image comprising m×n pixels, there will thus be m×n subregions within the security element 310, with image elements 345 in pixels (subregions) 320 having a particular grey level being phase-displaced relative to pixels having different grey levels, the phase-displacement being determined by the difference in grey levels. The m×n subregions form part of a collective image 321 when the device is viewed at angle 331.

As the viewing angle changes from angle 331 to angle 332, the viewer sees a substantially continuous change from the collective image 321 to the collective image 322. Likewise, a further change in viewing angle to angle 333 results in a continuous change in contrast of the image elements 345 so that the security element 310 takes on the appearance of image 323, and so on until a complete inversion of the grey levels takes place and the negative 325 of image 321 becomes visible.

Referring now to FIGS. 9A and 9B and 10A and 10B, the correspondence between pixels of the greyscale bitmap 300 and image elements of the corresponding optically variable device is shown. Bitmap 300 is represented as a series of parallel printed lines in artwork 400. For example, focusing on region 360 of the bitmap which corresponds to region 460 of the artwork, the pixels 361 and 362 which have different phase displacements relative to the associated lenses (not shown) and which are also of course phase displaced relative to each other are represented by line elements 461 and 462 in respective subregions.

In a representative example of a method for manufacturing optically variable devices substantially as described above, a layer of UV curable ink is applied to one side of a 75 micron thick biaxially oriented polypropylene (BOPP) film. The UV ink is then embossed with lens structures 42 and cured to produce a lenticular substrate with a total thickness of approximately 85 to 90 microns.

The surface opposite the lens structures 42 is gravure printed with image elements of a single color, the image elements being phase displaced relative to each other and/or the associated lenses as appropriate.

A color for the image elements is one which will produce sufficient contrast yet is difficult to imitate. Trials have been conducted with black ink, but blue, magenta, violet or scarlet are optional colors.

In a representative gravure printing process, a gravure cylinder engraved with the resolution of 10,160 dpi (smallest incremental change in image element position of 2.5 microns) is used. The corresponding gravure engraving file is a binary digital image of the phase displaced image elements, compensated for the anticipated growth in size of the digital image elements after they are printed.

The invention claimed is:

1. A security element comprising:
   a plurality of focusing elements; and
   an object plane including at least four subregions, each subregion including a corresponding image element,
   wherein each image element is associated with one of the focusing elements,
   wherein each image element is phase-displaced by a phase-displacement distance with respect to image elements within other subregions,
   wherein each of the at least four subregions correspond to pixels of a greyscale image having at least four grey levels, the grey levels determined by the phase displacements between the image elements in the subregions,
   wherein each of the at least four subregions produces a positive state image at a first viewing angle and a negative state image at a second viewing angle, and different subregions display a switch between the positive and negative state images at different viewing angles,
   wherein the subregions collectively produce a half-tone or continuous-tone image which appears to change contrast substantially continuously as the viewing angle changes.

2. The security element according to claim 1, wherein the focusing elements are located a distance from the object plane which is less than the focal length of the focusing elements.

3. The security element according to claim 2, wherein the distance t is such that the focal point width of the focusing elements in the object plane is substantially equal to the size of the image elements, or differs from the size of the image elements by a predetermined amount whilst still producing the first and second images or third and fourth images.

4. The security element according to claim 1, wherein image elements of the subregions are phase-displaced by different distances relative to the associated focusing elements.

5. The security element according to claim 1, wherein the focusing elements are on one side of a transparent or translucent substrate.

6. The security element according to claim 5, wherein the image elements are on the opposite side of the transparent or translucent substrate.

7. The security element according to claim 1, wherein the images of each subregion change brightness and/or contrast as the viewing angle is changed.

8. The security element according to claim 1, wherein the image elements are gravure-printed elements.

9. The security element according to claim 1, wherein the image elements are embossed, offset-printed, screen-printed or flexographically printed elements.

10. The security element according to claim 1, wherein the image elements are line elements.

11. The security element according to claim 10, wherein each of the line elements has a width which is substantially equal to or greater than half the width of the focussing elements.

12. The security element according to claim 1, wherein the phase-displacement distance is less than or equal to half the width of the focusing elements.

13. The security element according to claim 1, wherein the focusing elements are refractive or diffractive cylindrical lenses, or zone plates.

14. The security element according to claim 1, wherein the focusing elements are refractive or diffractive part-spherical or polygonal-base microlenses.

15. A method of forming a security device, comprising:
    providing a transparent or translucent substrate;
    applying a plurality of focusing elements to a first surface of the substrate; and
    applying a plurality of image elements to another surface of the substrate comprising an image surface, the image surface including at least four subregions, each subregion having a corresponding image element and each image element being associated with one of the focusing elements; and
    phase-displacing each image element with respect to image elements within the other subregions,
    wherein each of the at least four subregions correspond to pixels of a greyscale image having at least four grey levels, the grey levels determined by the phase displacements between the image elements in the subregions, wherein the subregions collectively produce a half-tone or continuous-tone image which appears to change contrast substantially continuously as the viewing angle changes, wherein each of the at least four subregions produces a positive state image at a first viewing angle and a negative state image at a second viewing angle, and different subregions display a switch between the positive and negative state images at different viewing angles.

16. The method according to claim 15, wherein the focusing elements are applied by embossing.

17. The method according to claim 16, wherein the focusing elements are embossed in a layer of radiation-curable ink applied to the first surface of the substrate.

18. The method according to claim 15, wherein the image elements are applied by gravure printing.

19. The method according to claim 15, wherein the image elements are applied by embossing, offset printing, screen printing or flexographic printing.

20. The method according to claim 15, wherein image elements of the subregions are phase-displaced by different distances relative to the associated focusing elements.

* * * * *